United States Patent [19]

Labaziewicz

[11] Patent Number: 5,258,789
[45] Date of Patent: Nov. 2, 1993

[54] FILM CASSETTE
[75] Inventor: Peter Labaziewicz, Rochester, N.Y.
[73] Assignee: Eastman Kodak Company, Rochester, N.Y.
[21] Appl. No.: 794,081
[22] Filed: Nov. 18, 1991
[51] Int. Cl.[5] .............................................. G03B 17/26
[52] U.S. Cl. ...................................... 354/21; 354/275
[58] Field of Search .................. 354/275, 21; 242/71.1
[56] References Cited

U.S. PATENT DOCUMENTS 5,025,274  6/1991  Pagano ................................... 354/21
5,032,854  2/1991  Smart et al. ............................ 354/21

FOREIGN PATENT DOCUMENTS 89-10797  3/1989  Japan ................................... 354/275

OTHER PUBLICATIONS

Novel Bar Coding . . . Mail; Dolash et al.; May 3-5, 1988.
Battelle's Invisible . . . Technology; Battelle; Dec. 10, 1990.

Primary Examiner—David M. Gray
Attorney, Agent, or Firm—Roger A. Fields

[57] ABSTRACT

A group of film cassettes individually comprise a rotary disk, a bar code on the disk having alternating spaces and bars which when optically detected can provide film-related information and a measure of the angular position of the disk, and eye detectable film exposure status indicia and a corresponding indicator one of which is on the disk and the other is fixed to align respective ones of the exposure status indicia and the indicator in accordance with the angular position of the disk. The bar code is visible substantially only to infrared radiation to make it essentially invisible to the human eye but to allow it to be optically detected with infrared radiation, and has at least one space and/or bar with the same location on the disk for each of the cassettes. The indicator or exposure status indicia on the disk is superimposed or integrated with the one space and/or bar to economize available space on the disk, and is optically indistinguishable in infrared radiation from the one space and/or bar to prevent its being optically detected with infrared radiation.

13 Claims, 3 Drawing Sheets

FILM CASSETTE

BACKGROUND OF THE INVENTION

1. Field of the Invention

The invention relates generally to the field of photography, and in particular to film cassettes containing roll film.

2. Description of the Prior Art

Commonly assigned U.S. Pat. No. 5,025,274, issued Jun. 18, 1991 discloses a film cassette wherein the filmstrip, including a non-protruding film leader, is coiled about a spool inside a light-tight cassette shell. Rotation of the spool in an unwinding direction can propel, i.e. thrust, the film leader out of the shell regardless of whether the filmstrip is unexposed, only partly exposed, or fully exposed. Various film exposure status indicia are printed on the shell which form respective visible indications that the filmstrip is unexposed, partly exposed, or fully exposed. A pointer is fixed to one end of the spool to be aligned initially with the unexposed indicium and to be aligned thereafter with the partly exposed indicium or the fully exposed indicium responsive to rotation of the spool to corresponding angular positions. A disk fixed to another end of the spool has a film information bar code. The bar code, when optically detected during rotation of the spool in a winding direction to rewind the filmstrip into the shell, provides a measure of the angular position of the spool to facilitate its being stopped with the pointer aligned with the partly exposed indicium or the fully exposed indicium.

Commonly assigned U.S. Pat. No. 5,032,854, issued Jul. 16, 1991 discloses a film cassette similar to the one disclosed in U.S Pat. No. 5,025,274 except that the pointer is printed on the disk radially inward of the bar code, rather than being located remotely from the disk as in the latter patent. However, with the pointer located radially inward of the bar code, one might visually confuse one of the discrete bars of the bar code for the pointer.

SUMMARY OF THE INVENTION

A group of film cassettes individually comprise a rotary disk, a bar code on the disk having alternating spaces and bars which when optically detected can provide film related information and a measure of the angular position of the disk, and eye detectable film exposure status indicia and a corresponding indicator one of which is on the disk and the other is fixed to align respective ones of the exposure status indicia and the indicator in accordance with the angular position of the disk. According to the invention, the bar code is visible substantially only to infrared radiation to make it essentially invisible to the human eye but to allow it to be optically detected with infrared radiation, and has at least one space and/or bar with the same location on the disk for each of the cassettes. The indicator or exposure status indicia on the disk is superimposed or integrated with the one space and/or bar to economize available space on the disk, and is optically indistinguishable in infrared radiation from the one space and/or bar to prevent its being optically detected with infrared radiation.

As compared to the film cassette disclosed in U.S. Pat. No. 5,025,274, wherein the pointer and the disk with the bar code are located at opposite ends of the film spool, the invention allows for a smaller cassette by locating the indicator, for example, on the disk.

As compared to the film cassette disclosed in U.S. Pat. No. 5,032,854, wherein the pointer is located radially inward of the bar code on the disk, the invention allows for a smaller disk by locating the indicator, for example, over one of the bars and/or spaces of the bar code. Also, it prevents confusion between the indicator, for example, and one of the bars of the bar code by making the bar code visible substantially only to infrared radiation to make it essentially invisible to the human eye.

DETAILED DESCRIPTION OF THE PREFERRED EMBODIMENT

Commonly assigned U.S. Pat. Nos. 5,025,274, issued Jun. 18, 1991, and U.S. Pat. No. 5,032,854, issued Jul. 16, 1991, are incorporated by reference in this application.

Figure 1:
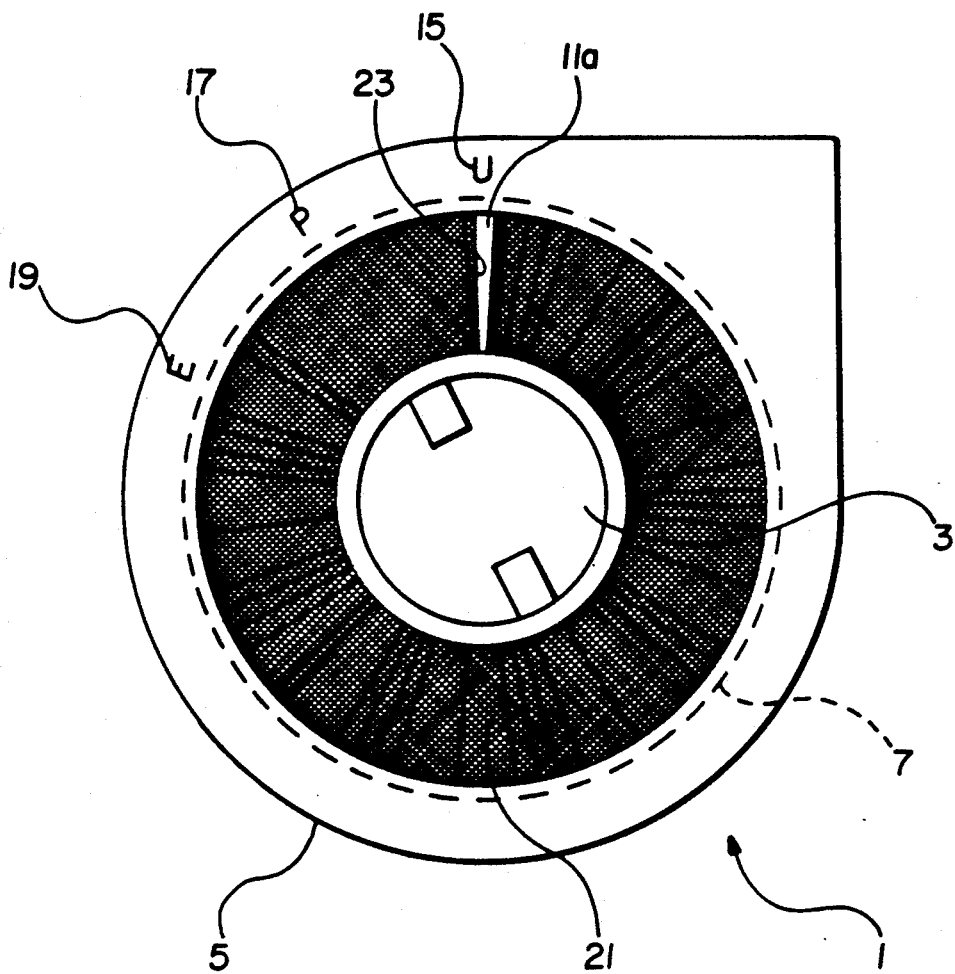
FIG. 1 is an end view of a film cassette according to a preferred embodiment of the invention.

Referring now to the drawings, FIG. 1 depicts a film cassette 1 similar in certain respects to the ones disclosed in the two incorporated patents. Consequently, only the elements of the invention are described in this application.

The film cassette 1 is of the type wherein a filmstrip (not shown), including a non-protruding film leader, is coiled about a spool 3 inside a light-tight cassette shell 5. Rotation of the spool 3 in an unwinding direction, i.e. clockwise in FIG. 1 propels the film leader out of the shell 5. Rotation of the spool 3 in a winding direction, i.e. counter-clockwise in FIG. 1, returns the filmstrip into the shell 5. Other details of the film cassette 1 in this connection are described in incorporated U.S. Pat. No 5.025.274.

Figure 2:
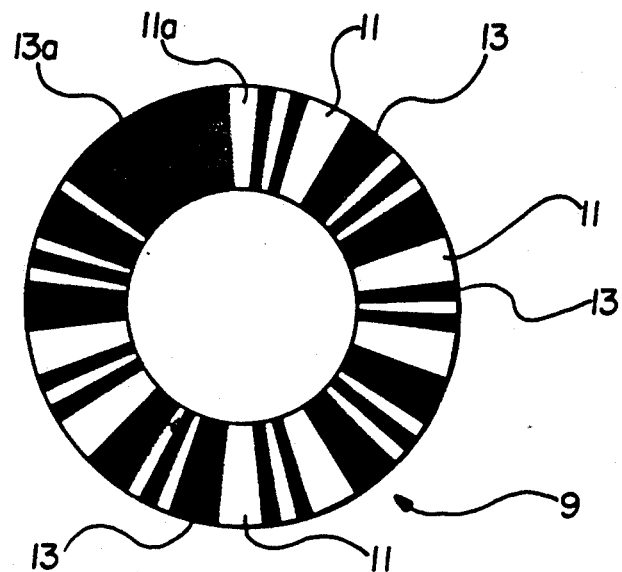
FIG. 2 is a plan view of a bar code to be printed on a rotary disk in the cassette.
Figure 3:
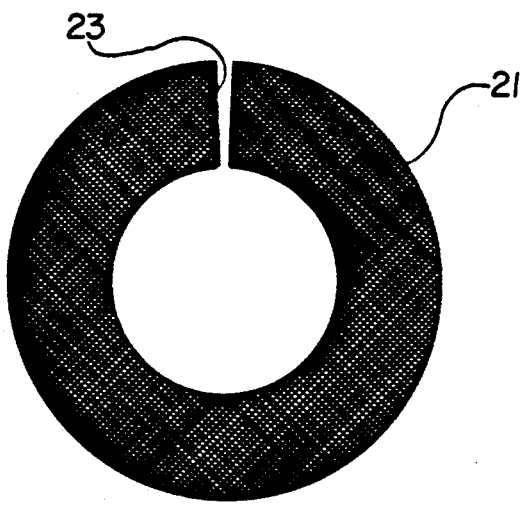
FIG. 3 is a plan view of a visually opaque infrared transmissive overcoat for the bar code.
Figure 4:
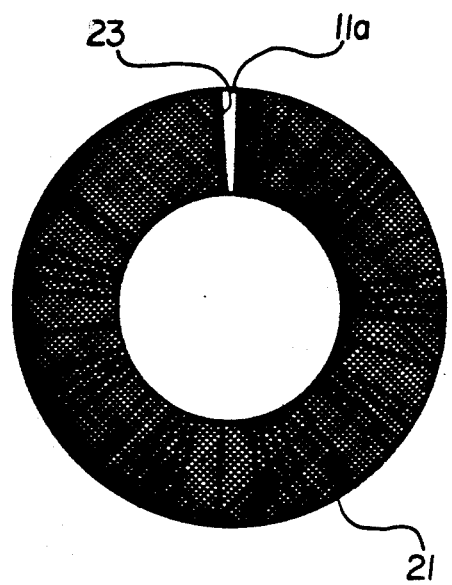
FIG. 4 is a plan view of the overcoat on the bar code.

A disk 7 is coaxially fixed to the spool 3. An optically detectable radial bar code 9 on an exterior planar surface of the disk 7 consists essentially of alternating photo-reflective (including infrared-reflective) spaces 11 and photo-absorbent (including infrared-absorbent) bars 13 which when optically detected provide film-related information and a measure of the angular position of the disk 7. See FIGS. 1 and 2. Specifically, when the spool 3 is rotated in the unwinding direction, the bar code 9 can be optically detected to provide film-related information, and when the spool is rotated in the winding direction, the bar code can be optically detected to provide a measure of the angular position of the disk 7. One of the spaces 11 is a start space 11a for the bar code 9, and one of the bars 13 is a start bar 13a for the bar code. Preferably, the spaces 11 are white and the bars 13 are black, as is conventional, although other photo-reflective and photo-absorbent colors may be used. Other details of the bar code 9 in this connection are described in incorporated U S. Pat. No. 5,032,854.

Eye detectable film exposure status indicia 15, 17, and 19 in the form of a "U", a "P", and an "E" are printed on an exterior planar surface of the shell 5. The "U" indicium 15 signifies that the filmstrip is fresh, i.e. unexposed. The "P" indicium 17 signifies that the filmstrip is only partly exposed. The "E" indicium 19 signifies that the filmstrip is fully exposed.

Preferably, the black bars 13 (including the start bar 13a) are printed atop the disk 7 with a carbon black pigment ink that will make the bars visible to light to permit them to be seen by the human eye and visible to infrared radiation to permit their optical detection using a conventional IR scanner or reader. The black color makes the bars visible to the human eye, and the carbon makes the bars very absorbent of infrared radiation.

For the purpose of clarification, light is the only type of electromagnetic radiation that is visible to the human eye. The other types, such as infrared radiation are not visible to the human eye because they have different wavelengths than light. Light has a wavelength range of 400 nm –700 nm which makes it visible to the human eye. Infrared radiation has a wavelength range beginning above 700 nm, generally at 800 nm, which makes it invisible to the human eye. Between 700 nm and 800 nm is what is known as "near" infrared radiation.

The bar code 9 is coated with an overcoat 21 except substantially at the start space 11a. See FIGS. 1–4. Preferably, the overcoat 21 is formed of an organic ink, such as non-carbon black pigment ink, that will make the bar code 9 essentially invisible to light to prevent its being seen by the human eye and visible to infrared radiation to permit its optical detection using a conventional IR scanner or reader. The black pigment of the ink makes it visually opaque to substantially conceal the bar code 9, and the non-carbon aspect allows it to be infrared transmissive (as opposed to infrared absorbent) to allow the bar code to be visible to infrared radiation. The ink may be made of black pigment, or a mixture of red and blue pigments, or a mixture of magenta, yellow and cyan pigments. In each instance, the result is an almost black or black color. It is not mandatory that the overcoat 21 have a black color; however, it must be dark enough to substantially conceal the bars 13 of the bar code 9. Two samples of the ink were obtained from Sun Chemical Corporation, 631 Central Avenue, Carlstadt, N.J. 07072, and are identified as HC Black #PM88I809200B and IR Water Code Black #ROA90072F.

Since the overcoat 21 has a radial slit 23 bounding the start space 11a, the start space is not concealed by the overcoat and, therefore, can serve as a pointer 11a. See FIGS. 1 and 4. The pointer 11a is aligned initially with the "U" indicium 15 to provide a visual indication the filmstrip is unexposed. Alternatively, the pointer 11a may be aligned with the "P" indicium 17 to provide a visual indication the filmstrip is only partly exposed, or with the "E" indicium 19 to provide a visual indication the filmstrip is fully exposed. In each instance, the pointer 11a is aligned with the "U" indicium 15, the "P" indicium 17, or the "E" indicium 19 according to the angular position of the disk 7.

As compared to the film cassette in U.S. Pat. No. 5,032,854, wherein the pointer is located radially inward of the bar code on the disk, the preferred embodiment allows the disk 7 to be smaller by integrating the pointer 11a with the start space 11a. Also, it prevents confusion between the pointer 11a and the bar code 9 by making the bar code visible only to infrared radiation and thus preventing it from being seen by the human eye in light.

First Alternative Embodiment

Figure 5:
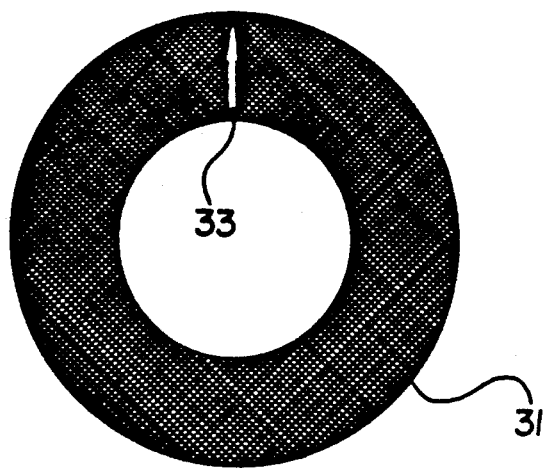
FIG. 5 is a plan view of a visually opaque infrared transmissive overcoat according to an alternative embodiment of the invention.
Figure 6:
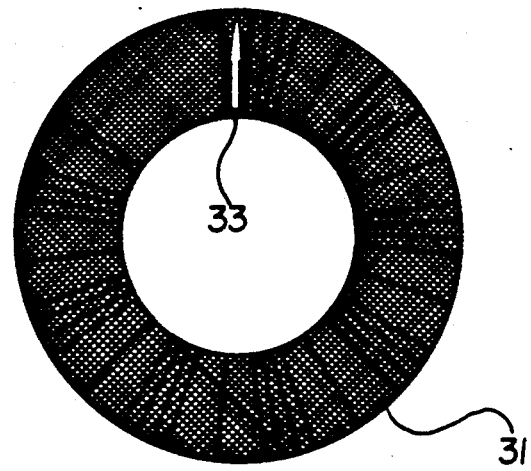
FIG. 6 is a plan view of the overcoat of FIG. 5 on the bar code.

FIG. 5 depicts an overcoat 31 that is the same as the overcoat 21 except that it does not have the radial slit 23. Instead, it completely covers the bar code 9, including the start space 11a of the bar code. See FIG. 6. A pointer 33 is printed using a white pigment ink on the overcoat 31 to be superimposed with the start space 11a. The pointer 33 has substantially the same color and photo-reflectivity (including infrared reflectivity) as the start space 11a, and thus is optically indistinguishable in infrared radiation from the start space.

Second Alternative Embodiment

If the bars 13 of the bar code 9 are made only infrared absorbent, i.e. not light absorbent, they are visible only to infrared radiation, and thus are invisible to the human eye in light. Because the bars 13 are invisible to the human eye, a pointer may be printed using non-carbon color pigment ink on any space(s) 11 and/or any bar(s) 13 of the bar code 9. In this instance, the pointer must be infrared transmissive to make it invisible to infrared radiation, and it should be contrasted in color from the exterior planar surface of the disk 7 to be seen by the human eye.

Third Alternative Embodiment

Here, the bars 13 of the bar code 9 are the same as in the second alternative embodiment. However, the pointer is printed on the start bar 13a only, and is made infrared absorbent like the start bar. In this instance, the pointer is contrasted in color from the exterior planar surface of the disk 7 to be seen by the human eye in light and, since it is infrared absorbent like the start bar 13a, it is optically indistinguishable in infrared radiation from the start bar.

The invention has been described with reference to preferred and alternative embodiments. However, it will be appreciated that variations and modifications not disclosed can be effected within the ordinary skill in the art without departing from the scope of the invention. For example, instead of locating the pointer on the disk 7 and the film exposure indicia 15, 17, and 19 on the cassette shell 3, the pointer may be located on the shell and the indicia on the disk. Also, instead of using infrared radiation as the medium for optical detection, other forms of electromagnetic radiation not visible to the human eye, such as ultraviolet radiation, may be employed. In this instance, the bars of the bar code and, similarly, the pointer would be visible substantially only to the other radiation.

I claim:

1. A plurality of film cassettes individually comprising (a) rotary means rotatable to various angular positions, (b) an optically detectable bar code on said rotary means having alternating photo-reflective spaces and photo-absorbent bars which when optically detected can provide a measure of the angular position of the rotary means, and (c) eye detectable film exposure status indicia and a corresponding indicator one of which is on said rotary means to align respective ones of said exposure status indicia and said indicator in accordance with the angular position of the rotary means, is characterized in that:

at least one of said alternating spaces or bars has the same location on said rotary means for each of said cassettes;

said bar code is visible substantially only to electromagnetic radiation in a predetermined wave length range not including 400 nanometers –700 nanometers to make it essentially invisible to the human eye in light but to allow it to be optically detected with the radiation in said predetermined wavelength range; and said one of said indicator or exposure status indicia on said rotary means is superimposed or integrated with said one space or bar to economize available space on the rotary means, and is optically indistinguishable in the radiation in said predetermined wavelength from the one space or bar to prevent its being optically detected with said radiation.

2. A plurality of film cassettes individually comprising (a) rotary means rotatable to various angular positions, (b) an optically detectable bar code on said rotary means having alternating photo-reflective spaces and photo-absorbent bars which when optically detected can provide a measure of the angular position of the rotary means, and (c) eye detectable film exposure status indicia and a corresponding indicator one of which is on said rotary means to align respective ones of said exposure status indicia and said indicator in accordance with the angular position of the rotary means, is characterized in that:

at least one of said alternating spaces or bars has the same location on said rotary means for each of said cassettes;

said bar code is visible substantially only to infrared radiation to make it essentially invisible to the human eye in light but to allow it to be optically detected with infrared radiation; and said one of said indicator or exposure status indicia on said rotary means is superimposed or integrated with said one space or bar to economize available space on the rotary means, and is optically indistinguishable in infrared radiation from the one space or bar to prevent its being optically detected with infrared radiation.

3. A plurality of film cassettes as recited in claim 2, wherein said one of said indicator or exposure status indicia on said rotary means includes substantially the same photo-reflectivity or photo-absorbtivity as said one said space or bar without making it visible substantially only to infrared radiation to make it optically indistinguishable in infrared radiation from the one space or bar.

4. A plurality of film cassettes as recited in claim 3, wherein said bar code is coated with visually opaque infrared transmissive means to make it invisible to light, and said one of said indicator or exposure status indicia on said rotary means is on said visually opaque infrared transmissive means over said one space or bar to make the one of the indicator or exposure status indicia on the rotary means visible to the human eye but optically indistinguishable in infrared radiation from the one space or bar.

5. A plurality of film cassettes as recited in claim 4, wherein said one of said indicator or said exposure status indicia on said rotary means is substantially the same color as said one space and bar.

6. A plurality of film cassettes as recited in claim 2, wherein said one space or bar is a start component of said bar code.

7. A plurality of film cassettes as recited in claim 2, wherein said bars are only infrared-absorbent to make them visible only to infrared radiation, and said one of said indicator or exposure status indicia on said rotary means is infrared-transmissive to make it invisible to infrared radiation.

8. A plurality of film cassettes as recited in claim 2, wherein said bars are only infrared-absorbent to make them visible only to infrared radiation and one of them has the same dimensions and site on said rotary disk for each of said cassettes, and said one of said exposure status indicia and indicator on said rotary means is infrared-absorbent and is superimposed with said one bar to make it optically indistinguishable in infrared radiation from the one bar.

9. A plurality of film cassettes individually comprising (a) rotary means rotatable to various angular positions, (b) an optically detectable bar code on said rotary means having alternating photo-reflective spaces and photo-absorbent bars which when optically detected can provide a measure of the angular position of the rotary means, and (c) eye detectable film exposure status indicia and a corresponding indicator one of which is on said rotary means to align respective ones of said exposure status indicia and said indicator in accordance with the angular position of the rotary means, is characterized in that:

one of said alternating spaces or bars has the same site and dimensions on said rotary means for each of said cassettes; and said bar code except at least substantially for said one space or bar is visible only to infrared radiation to make it invisible to the human eye but to allow it to be optically detected with infrared radiation and to allow at least substantially the one space or bar to be visible to the human eye to serve as said one of said indicator or exposure status indicia on said rotary means.

10. A plurality of film cassettes as recited in claim 9, wherein said one space or bar is a start component for said bar code.

11. A film cassette comprising (a) various eye readable film exposure status indicia, (b) rotary means rotatable to various angular positions relative to respective ones of said exposure status indicia, (c) an optically detectable bar code on said rotary means having alternating photo-reflective spaces and photo-absorbent bars which when optically detected can provide a measure of the angular position of the rotary means, and (d) a pointer on said rotary means which can be aligned with respective ones of said exposure status indicia in accordance with the angular position of the rotary means, is characterized in that:

one of said spaces or bars is a start component of said bar code;

said bar code is visible substantially only to infrared radiation to make it essentially invisible to the human eye but to allow it to be optically detected with infrared radiation; and said pointer is superimposed or merged with and has substantially the same photo-reflectivity or photo-absorbtivity as said one space or bar without making it visible substantially only to infrared radiation to make it optically indistinguishable in infrared radiation from the one space or bar.

12. A method of modifying a plurality of film cassettes individually comprising (a) rotary means rotatable to various angular positions, (b) an optically detectable bar code on said rotary means having alternating photo-reflective spaces and photo-absorbent bars which when optically detected can provide a measure of the angular position of the rotary means, and (c) eye detectable film exposure status indicia and a corresponding indicator one of which is on said rotary means to align respective ones of said exposure status indicia and said indicator in accordance with the angular position of the rotary means, is characterized by the steps of:

arranging one of said alternating spaces or bars to have the same site and dimensions on said rotary means for each of said cassettes;

making said bar code visible substantially only to infrared radiation to make it essentially invisible to the human eye but to allow it to be optically detected with infrared radiation; and arranging said one of said indicator or exposure status indicia on said rotary means superimposed or integrated with said one space or bar to economize available space on the rotary means, and making it optically indistinguishable in infrared radiation from the one space or bar to prevent it from being optically detected with infrared radiation.

13. A method as recited in claim 12, characterized by the further step of:

arranging said one space or bar to be a start component for said bar code.

* * * * *